United States Patent

[11] 3,633,121

[72] Inventor Wayne E. Bretl
Chicago, Ill.
[21] Appl. No. 855,613
[22] Filed Sept. 5, 1969
[45] Patented Jan. 4, 1972
[73] Assignee Motorola, Inc.
Franklin Park, Ill.

[54] GAMMA CONTROL CIRCUIT
5 Claims, 2 Drawing Figs.

[52] U.S. Cl. .......... 330/40, 178/6, 330/29, 330/145
[51] Int. Cl. .......... H03f 3/04
[50] Field of Search .......... 178/6; 330/22, 29, 40, 95, 145

[56] References Cited

UNITED STATES PATENTS

| | | | |
|---|---|---|---|
| 2,904,642 | 9/1959 | Quinlan .......... | 330/95 X |
| 3,509,480 | 4/1970 | Hickman .......... | 330/29 X |
| 3,031,624 | 4/1962 | Moore et al. .......... | 329/101 |

*Primary Examiner*—Roy Lake
*Assistant Examiner*—Lawrence J. Dahl
*Attorney*—Mueller & Aichele

ABSTRACT: A gamma control circuit providing transfer characteristics for an amplifier with constant linear slopes above and below well-defined breakpoints utilizes transistor switches biased to conduct at predetermined levels. The switches are connected in series with gamma correction impedances across the load impedance of the amplifier being controlled.

Inventor
WAYNE E. BRETL
BY
Mueller, Aichele & Rauner
ATTYS.

GAMMA CONTROL CIRCUIT

BACKGROUND OF THE INVENTION

In many television systems, the relationship between the light output at the picture tube and the light input at the camera is not linear but exhibits nonlinear characteristics. The primary source of this nonlinearity is the picture tube in the receiver; and if a linear relationship between the light input and the light output is desired, it is necessary to correct for this nonlinearity at the transmitting station or at the receiver or both. The nonlinear characteristic causes the light values at either the white or the black levels to vary on an exponential or logarithmic curve, and the extent to which the light values are emphasized is indicated by a factor called "gamma" (output/input). For a gamma characteristic of less than one, the contrast of the reproduced picture is reduced, and the reproduced picture appears soft or lacking in contrast. On the other hand, if the over all gamma of the television system is greater than one, the white parts of the picture are emphasized; and the apparent contrast is emphasized, with the reproduction appearing harsh. It is desirable to cause the overall system gamma to be approximately equal to one or unity, so that the output signal is directly proportional to the input signal without emphasis of any signal level and resulting in the most realistic reproduction.

Gamma correction amplifiers for correcting for the inherent gamma distortion present in a television system generally are nonlinear amplifiers having transfer characteristics which oppose or compensate the gamma distortion; so that by using such an amplifier, a linear response may be obtained. The use of such a nonlinear amplifier, however, necessarily requires the gamma distortion or correction circuit to be dependent upon the characteristics of the amplifying device itself, and variations between different devices cause variations in the gamma correction or distortion which is obtained. As a consequence, it is necessary to match the amplifier devices to the system in which they are used in order to obtain the desired ideal gamma correction or distortion characteristics.

In order to avoid the dependence of the gamma correction circuits on the parameters or characteristics of the amplifying devices themselves, a nonlinear approximation has been achieved by the use of semiconductor diodes which are switched into conduction at predetermined signal levels to change impedance in the output of an amplifier, thereby changing the amplifier gain from one linear curve to another linear curve at predetermined breakpoints. Such semiconductor switching diode circuits, however, have a relatively high power consumption.

SUMMARY OF THE INVENTION

Accordingly it is an object of this invention to provide an improved gamma control circuit.

It is an additional object of this invention to provide an improved gamma control circuit using three-element semiconductor switches to provide a transfer characteristic with constant linear slopes above and below well-defined breakpoints.

It is a further object of this invention to use transistor switches connected in series with impedances across the load resistors of an amplifier, with the transistor switches being switched into conduction at predetermined signal levels at the amplifier output to provide a transfer characteristic with constant linear slopes above and below well-defined breakpoints.

In accordance with a preferred embodiment of this invention, a gamma control circuit includes a first impedance connected to the output of the drive amplifier which is to be controlled and across which the output signal is developed. An additional impedance is connected in series with first and second elements of a three element semiconductor switch, the third element of which is provided with a biasing control potential. The semiconductor switch is rendered conductive when a predetermined potential or signal level is reached across the first impedance to switch the second impedance into circuit in parallel with the first impedance. This produces a transfer characteristic for the amplifier of different linear slopes above and below a well-defined breakpoint.

DETAILED DESCRIPTION

Figure 1:
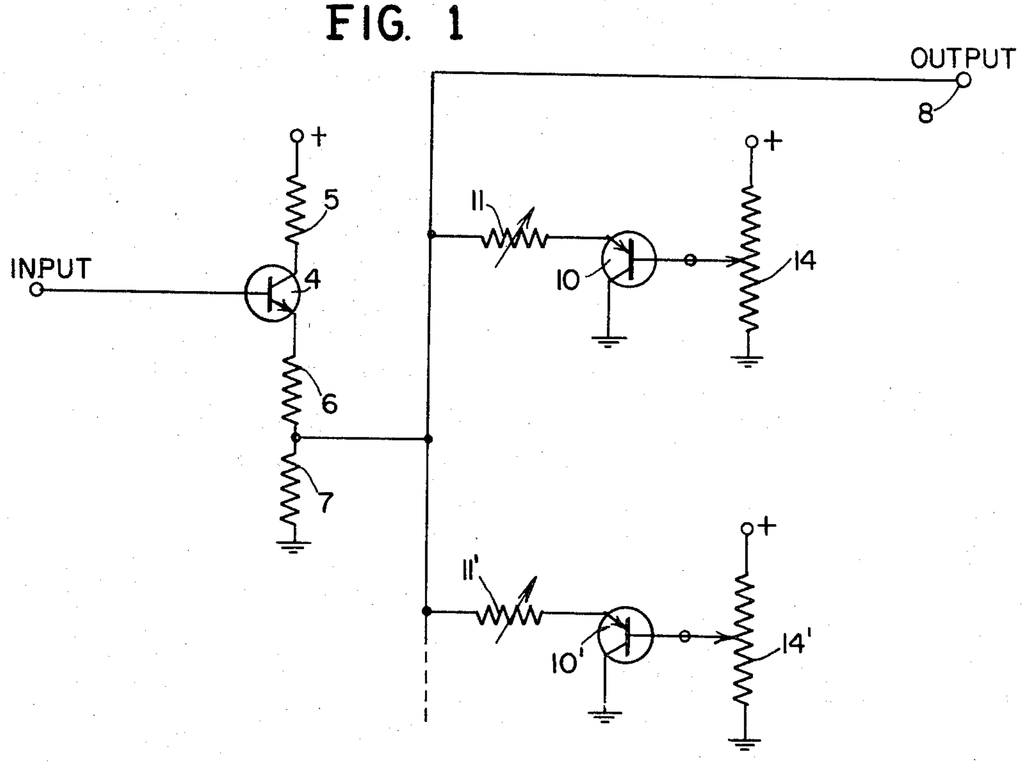
FIG. 1 is a circuit diagram of a preferred embodiment of the invention.

Referring now to FIG. 1, there is shown a gamma correction circuit suitable for use with a television receiver and including a video drive amplifier in the form of an NPN-transistors 4. The video input signals are applied to the base of the transistor 4, the collector of which is connected through a suitable collector resistor 5 to a source of positive potential. The emitter of the transistor 4 is connected to ground through a pair of emitter-resistors 6 and 7, and amplified video output signals are obtained from the junction of the resistors 6 and 7. These output signals, applied to an output terminal 8, then may be utilized as the video driving signals for the cathode ray tube of the television receiver.

Because of the nonlinear characteristics of the television system, however, it is desirable to provide a nonlinear transfer characteristic of the output of the video driver amplifier 4 at the terminal 8. Without the addition of a gamma correction circuit, the output obtained from the terminal 8 would exhibit substantially linear characteristics. With a linear input applied to the picture tube, the picture tube characteristic is generally as shown in curve A of FIG. 2, with the input being represented by the control grid voltage from cutoff, and with the output being represented as the brightness in foot-lamberts. As a consequence, the output at terminal 8 from the video driver transistor 4 should exhibit an opposing characteristic in order to overcome or nullify this nonlinearity.

In order to accomplish this, a number of transistor switches, each connected in series with a gamma correction resistor are connected in parallel across the resistor 7. A first one of these transistor switches includes a PNP-transistor 10 connected in series with a variable resistor 11 between ground and the junction of the resistors 6 and 7, with the emitter of the transistor 10 being connected to the resistor 11 and with the collector of the transistor 10 being connected to ground. The base of the transistor 10 is provided with a reference or biasing potential from a voltage divider consisting of a high-impedance potentiometer resistor 14 connected between the source of positive potential and ground. The voltage applied to the base of the transistor 10 is obtained from a movable tap on the resistor 14, so that the conduction point of the transistor 10 may be controlled accordingly.

Figure 2:
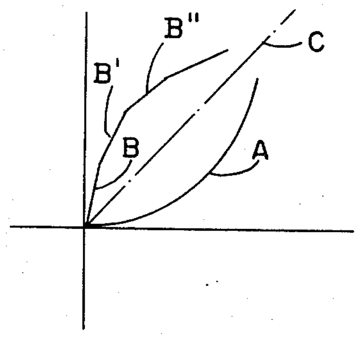
FIG. 2 shows curves useful in illustrating the operation of the circuit shown in FIG. 1.

For low input signal levels on the base of the transistor 4, the curve of the output voltage vs. input voltage is the linear trace B of FIG. 2 and the transistor 10 is nonconductive.

Whenever the output potential present at the junction of the resistors 6 and 7 exceeds the potential present on the base of the PNP-transistor 10 is forward-biased into conduction and provides a constant DC voltage at its emitter, so that the emitter-collector impedance is negligible. When this occurs the output characteristic of the amplifier, as it appears at the output terminal 8, is on a second linear trace B'; as shown in FIG. 2. Again, the output is linear during the time that the transistor 10 is conductive; but the slope of the portion of the trace B' is less than the slope of the trace B when the transistor 10 is nonconductive. This is caused by the added impedance of the resistor 11 which is connected in parallel with the resistor 7.

In order to provide additional breakpoints to more closely approximate the inverse of curve A, additional stages similar to the stage including the transistor 10 and the resistor 11 may be connected in parallel across the resistor 7. One other additional stage including a similar PNP-transistor 10' and a variable resistor 11' is shown, with the bias on the base of the transistor 10′ being provided by a high-impedance voltage divider potentiometer 14′ similar to the voltage divider 14. The biasing potential applied to the base of the transistor 10′ by the voltage divider 14′, however, is a higher potential, so that the potential present at the output terminal 8 must reach a higher level before the transistor 10′ is rendered conductive. After the transistor 10′ is rendered conductive, however, the combined conduction of the transistor 10 and 10′ connects the resistors 11 and 11′ in parallel with the resistor 7, causing the output transfer characteristic of the amplifier to be along the linear trace B″ shown in FIG. 2. Additional stages may be provided as needed, with the numbers of stages depending upon the degree of accuracy of the matching of the linear traces B, B′, etc. to the curve A which is desired in the system. Each of the additional stages is similar to additional stage all being connected to the junction of the resistors 6 and 7 and the output terminal 8.

It can be seen from an examination of FIG. 2 that the resultant output trace C, shown in dotted lines, which is provided by the gamma compensation circuit shown in FIG. 1 is substantially a straight line. Since the transistors 10, 10′ are either nonconductive or provide a constant DC voltage, the compensation provided is not dependent upon the characteristics of the transistors themselves, because the collector-emitter paths of the transistors are connected in series with the resistors 11, 11′. Thus, the base-emitter characteristics of the switching transistors are not in the circuit of the compensating resistors 11, 11′. As a result, consistent operation of the circuit is obtained with different transistors. The desired slopes of the traces B′, B″, etc. may be obtained by suitable adjustment of the variable resistors 11 and 11′, etc. The desired breakover or switching points are selected by adjustment of the taps on the voltage dividers 14 and 14′, etc.

The circuit operates by changing the load resistance at the output terminal 8 when the video output voltage at the terminal 8 reaches a preset value or values. Each breakpoint occurs when the voltage at the output terminal 8 equals or exceeds the voltage set at the base of the transistors 10, 10′, etc. plus the $V_{BE}$ drop in the transistors 10, 10′, etc.

It should be noted that the operation of the transistor 10, 10′ is not in the saturation region, but in the normal active region. The current gain of the transistor 10, 10′ provides the low impedance at the emitter and high impedance at the base.

For output voltages less than any of the turn-on points in the switching transistors 10, 10′, etc., the gain of the circuit is:

$$\Delta V_{Out}/\Delta V_{In}=R_7/R_6+R_7$$

For voltages greater than the turn-on point of the transistor 10 the gain is:

$$\frac{\Delta V_{\text{Out}}}{\Delta V_{\text{In}}}=\left(\frac{R_7R_{11}}{R_7+R_{11}}\right)\Big/\left[R_6+\left(\frac{R_7R_{11}}{R_7+R_{11}}\right)\right]$$

The gain of the system as each additional switching transistor 10′, etc. is rendered conductive can be comparably calculated, and the desired ratios of the gains may be obtained by providing the desired impedances for the resistors 11, 11′ etc., as determined from the above equations. A typical gamma correction circuit which has been operated includes the following values for the resistors:

Table 1

| | |
|---|---|
| $R_6$ | 470 ohms. |
| $R_7$ | 470 ohms. |
| $R_{11}$ | 750 ohms. |
| $R_{14}$ | 7.5 k Ω |

From the foregoing it can be seen that very little current is drawn by the high-impedance potentiometers 14, 14′ in providing the biasing potential on the bases of the transistors 10, 10′, etc. By the use of the circuit of FIG. 1, well-defined, controlled transfer functions are obtained, with constant linear slopes above and below each breakpoint provided by each of the switching circuits connected in parallel with the resistance 7.

The circuit according to FIG. 1 may be used for gamma correction or predistortion of video signals in television cameras, receivers, video tape recorders, video players, electronic video recording/players and in video distribution systems, and the like. It should be noted that the values given in table 1 are considered as typical values only and are not to be construed in limiting the scope of the invention.

I claim:

1. A gamma control circuit including in combination:
a driver amplifier, the gain of which is to be controlled and which includes an amplifier transistor having collector, base and emitter electrodes;
first and second voltage supply terminals for connection across a DC supply voltage;
first impedance means coupled in circuit between one of said voltage supply terminals and one of the collector and emitter electrodes of said amplifier transistor, the other of the collector and emitter electrodes of said amplifier transistor being coupled in circuit with said other voltage supply terminal;
means for applying input signals to the base of said amplifier transistor;
second impedance means;
a switching transistor having base, emitter, and collector electrodes;
means for connecting said second impedance means and the emitter and collector of said switching transistor in series across said first impedance means in the order named with the collector of said switching transistor being coupled with said one of said voltage supply terminals;
voltage divider means connected between said first and second voltage supply terminals, with the magnitude of impedance of said voltage divider means being substantially greater than the magnitude of impedance of said second impedance means;
means coupling the base of said switching transistor with said voltage divider means for establishing a predetermined reference potential on the base of said switching transistor, said switching transistor being rendered conductive with the potential on the emitter thereof attaining a value sufficient to forward bias said switching transistor into conduction.

2. The combination according to claim 1 further including third impedance means connected at a first junction to said first impedance means and wherein the collector electrode of said amplifier transistor is connected to said first voltage supply terminal, with the emitter electrode of said amplifier transistor, said third impedance means and said first impedance means being connected in series in the order named to said second voltage supply terminal, and said second impedance means and the emitter and collector of said switching transistor are connected in series in the order named between said first junction and said second voltage supply terminals.

3. A gamma control circuit including in combination:
first and second voltage supply terminals for connection across a source of DC supply potential;
driver amplifier means, the gain of which is to be controlled, including an amplifier transistor having base, collector and emitter electrodes, the collector of which is connected in circuit with said first voltage supply terminal;
means for applying input signals to the base of said amplifier transistor;
first impedance means connected in circuit between a first junction coupled with the emitter of said amplifier transistor and said second voltage supply terminal;
a plurality of second impedance means;
a plurality of switching transistors, each having base, emitter and collector electrodes, the collector and emitter of each switching transistor being connected in series with a different second impedance means in the order named between said second voltage supply terminal and said first junction; and high-impedance voltage divider means connected between said first and second voltage supply terminals, said voltage divider means having a plurality of taps corresponding in number to the number of said plurality of switching transistors, with different ones of said taps connecting predetermined points on said voltage divider means to the bases of each of said switching transistors, each said switching transistor being rendered conductive when the voltage on the emitter thereof attains a level sufficient to forward bias said switching transistor, the magnitude of impedance of said voltage divider means being substantially greater than the magnitude of impedance of each of said second impedance means.

4. The combination according to claim 3 wherein said amplifier transistor is of one conductivity type and said switching transistors are of an opposite conductivity type.

5. The combination according to claim 1 further including first and second power supply terminals adapted to be connected across a power supply, wherein the driver amplifier includes an amplifier transistor of one conductivity type having collector, base and emitter electrodes, with the collector electrode of the amplifier transistor being connected in circuit with the first power supply terminal, and with the emitter electrode of the amplifier transistor being connected through the first impedance means to the second power supply terminal, and the switching transistor is of opposite conductivity type to the amplifier transistor with the collector of the switching transistor connected with the second power supply terminal and the emitter of the switching transistor connected through the second impedance means with the emitter of the amplifier transistor, the switching transistor being rendered conductive when the relative potentials applied to the base and emitter thereof forward bias the switching transistor.

* * * * *